United States Patent
Hamada

(10) Patent No.: US 7,221,385 B2
(45) Date of Patent: May 22, 2007

(54) PICTURE PHONE APPARATUS WHICH CHECKS VALIDITY OF PICTURE AND PICTURE PHONE SYSTEM USING THE SAME

(75) Inventor: Yoichi Hamada, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 10/790,736

(22) Filed: Mar. 3, 2004

(65) Prior Publication Data

US 2004/0227810 A1 Nov. 18, 2004

(30) Foreign Application Priority Data

Mar. 24, 2003 (JP) ............................. 2003-081473

(51) Int. Cl.
*H04N 7/14* (2006.01)
(52) U.S. Cl. .............................. 348/14.02; 348/14.01; 455/556.1
(58) Field of Classification Search .. 348/14.01–14.09, 348/14.1, 14.11, 14.12, 14.13, 14.16; 455/550.1, 455/556.1, 556.2, 557
See application file for complete search history.

(56) References Cited

FOREIGN PATENT DOCUMENTS

| JP | 4012113087 A | * | 8/1989 |
|---|---|---|---|
| JP | 6-62395 A | | 3/1994 |
| JP | 10-096702 | * | 4/1998 |
| JP | 10-98702 A | | 4/1998 |
| JP | 2000-078545 | * | 3/2000 |
| JP | 2000-78545 A | | 3/2000 |
| JP | 2000-287061 A | | 10/2000 |
| JP | 2001-186487 | * | 7/2001 |
| JP | 2002-077840 | * | 3/2002 |
| JP | 2002-77840 A | | 3/2002 |
| JP | 2002-125263 A | | 4/2002 |
| JP | 2002-247330 A | | 8/2002 |
| JP | 2002-354436 | * | 12/2002 |
| WO | WO 03/001773 A1 | | 1/2003 |

* cited by examiner

*Primary Examiner*—Melur Ramakrishnaiah
(74) *Attorney, Agent, or Firm*—Sughrue Mion, PLLC

(57) ABSTRACT

A picture phone apparatus includes an image picking section which picks up a picture data; a display section; a substitution picture storage section which stores a substitution picture data; an image processing section and a communication processing section. The image processing section checks whether the picked-up picture data is valid or invalid, retrieves the substitution picture data from the substitution picture storage section to output as transmission picture data when it is determined that the picked-up picture data is invalid, sets the picked-up picture data as the transmission picture data when it is determined that the picked-up picture data is valid, and encodes the transmission picture data. The communication processing section multiplexes the encoded transmission picture data and transmission audio data into transmission data and transmits the transmission data to a counter station.

16 Claims, 4 Drawing Sheets

PICTURE PHONE APPARATUS WHICH CHECKS VALIDITY OF PICTURE AND PICTURE PHONE SYSTEM USING THE SAME

BACKGROUND OF THE INVENTION

1. Field of the Invention

The present invention is related to a picture phone apparatus which checks whether picture data is valid or invalid and a picture phone system using the same.

2. Description of the Related Art

A picture phone apparatus has a function of communication with sound and a function of transmitting a picture of a user and a background picture to a counter station. In recent years, the picture phone apparatus is downsized as development of semiconductor technology and electronic technology. Recently, the models of a portable phone and PHS (Personal Handyphone System) telephone, which are provided with a camera, are becoming mainstream. In future, the picture phone apparatus seems to be widely used, allowing picture phone communication while it has the same functions and the same size as the present portable phone.

FIG. 1 shows the configuration of a conventional picture phone apparatus 300. The picture phone apparatus 300 can communicate by the radio wave through a public radio communication network (not shown) in real time. The picture phone apparatus 300 is composed of an imaging section 301, an image processing section 302, a multiplier 303, a display section 304, a communication control section 305, a separator 306, an audio processing section 307, a receiver 308, a transmitter 309 and an operation section 310.

The imaging section 301 includes a CCD camera and an image processor and is installed on an upper portion of a housing. The image processing section 302 compresses and converts picture data picked up by the imaging section 301 into transmission picture data. The multiplier 303 multiplexes the transmission picture data and transmission audio data, and outputs transmission data to the communication processing section 305. The display section 304 displays input data from the operation section 310, reception picture data and the picked-up picture data on a liquid crystal display (not shown). The communication processing section 305 controls communication with the public radio communication network. The separator 306 separates reception data into the reception picture data and reception sound data. The audio processing section 307 converts voice of a user supplied from the microphone 309 into the transmission sound data, and drives the speaker 308 to output the reception sound data from the separator 306. The operation section 310 includes alphanumeric keys which are used for input data and instructions.

As shown in FIG. 1, the picture data picked up by the imaging section 301 is encoded by the image processing section 302. The encoded picture data is sent to the multiplier 303 as the transmission picture data, and is multiplexed with the transmission audio data from the audio processing section 307 into the transmission data. The transmission data is transmitted to the public radio communication network by the communication processing section 305.

However, when the picture phone apparatus has a fold-type structure like a fold-type portable phone, an invalid picture such as a black picture is sent to the counter station when the picture phone apparatus is in a fold state or a lens cap is attached on a lens portion of the imaging section 301.

In order to solve this problem, the following technique is proposed in Japanese Laid Open Patent Application (JP-A-Heisei 10-98702). In this conventional example, a camera is provided to be popped up from the body of the picture phone apparatus. By operating the switch in conjunction with the popping of the camera, the transmission of the picked-up picture data to a counter station is prevented when the camera is stored, and is permitted when the camera is popped up. Also, in the transmission permission of the picture data, reception picture data is displayed. In the transmission prohibition of the picture data, the picture data picked-up by the camera is displayed only on the display section 304 of the picture phone apparatus, and is not transmitted to the counter station.

However, in the conventional picture phone apparatus, the picture data picked up by the camera is transmitted without checking whether the picture data is valid or invalid. For this reason, the picture data picked up by the camera under improper environment, e.g., in a dark place is transmitted to the counter station, which makes a user of the counter station uncomfortable.

In conjunction with the above description, a TV telephone is disclosed in Japanese Laid Open Patent Application (JP-A-Heisei 6-62395). In this conventional example, a storage unit stores picture data previously picked up by an imaging device. When a user of a receiver can not reply to a call at once, the picture data stored previously and speech data are synthesized into transmission data which is transmitted to a transmitter.

Also, an image processing apparatus is disclosed in Japanese Laid Open Patent Application (JP-P2000-287061A). In this conventional example, input bit map data is divided into blocks in accordance with block division positions indicating blocks of the whole final output image. It is checked whether each block is an invalid block which does not exist in the input bit map data. All valid blocks other than the invalid blocks are encoded.

Also, a communication terminal is disclosed in Japanese Laid Open Patent Application (JP-P2002-77840A). In this conventional communication terminal, reception picture data is generally displayed on a display unit. A storage unit stores a substitution picture data. Every time a user inputs a display switching instruction from a key input section during the communication, display picture data is alternately switched between the reception picture data and the substitution picture data.

Also, a mobile phone terminal is disclosed in Japanese Laid Open Patent Application (JP-P2002-125263A). In this conventional example, a control unit displays reception electric field intensity on a display section based on an electric field intensity signal from a radio communication section. During the picture communication, an electric field intensity display image is added to picture data picked up by an imaging section to be transmitted as transmission picture data. Also, when an alarm is generated from the control unit to indicate degradation of communication quality, an alarm image stored in a memory is added to the picture data picked up by the imaging section and transmitted or a substitution image stored in a storage is transmitted.

Also, an image processing apparatus is disclosed in Japanese Laid Open Patent Application (JP-P2002-247330A). In this conventional example, a valid image region and an invalid image region are separated from an image of a manuscript. A region determination image is generated based on the separation result to contain data of the valid image region and the invalid image region. An image processing section sets the invalid image region from a setting value by a user and the data of the valid image region and the invalid image region.

Also, a picture phone apparatus is disclosed in Japanese Laid Open Patent Application (JP-P2002-354436A). An imaging device picks up a user to produce picked-up picture data. EEPROM previously stores substitution picture data. A CG processing section selects one of the picked-up picture data and the substitution picture data in accordance with an instruction and the selected picture data is transmitted as transmission data.

SUMMARY OF THE INVENTION

An object of the present invention is to provide a picture phone apparatus in which it is checked whether picture data picked up by an imaging section is valid or invalid.

Another object of the present invention is to provide a picture phone apparatus in which substitution picture data is transmitted when it is determined that the picture data picked up by an imaging section is invalid.

Another object of the present invention is to provide a picture phone apparatus in which transmission picture data is displayed before transmission.

Also, another object of the present invention is to provide a picture phone apparatus in which it is checked whether reception picture data is valid or invalid.

Also, another object of the present invention is to provide a picture phone apparatus in which the substitution picture data is displayed when reception picture data is invalid.

In an aspect of the present invention, a picture phone apparatus includes an image picking section which picks up a picture data; a display section; a substitution picture storage section which stores a substitution picture data; an image processing section and a communication processing section. The image processing section checks whether the picked-up picture data is valid or invalid, retrieves the substitution picture data from the substitution picture storage section to output as transmission picture data when it is determined that the picked-up picture data is invalid, sets the picked-up picture data as the transmission picture data when it is determined that the picked-up picture data is valid, and encodes the transmission picture data. The communication processing section multiplexes the encoded transmission picture data and transmission audio data into transmission data and transmits the transmission data to a counter station.

Here, the image processing section may control the display section to display the transmission picture data. In this case, the picture phone apparatus may further include an operation section. The image processing section encodes and outputs the transmission picture data to the communication processing section when a picture transmission permission instruction is inputted from the operation section.

Also, the image processing section may determine whether the picked-up picture data is valid or invalid, based on at least one of brightness data of the picked-up picture data and spatial frequency of the picked-up picture data.

Also, the picture phone apparatus may further include an audio processing section; and a speaker. The communication processing section may receive reception data, separate the reception data into reception picture data and reception audio data, and output the reception picture data to the image processing section and the reception audio data to the audio processing section. The audio processing section decodes the reception audio data to produce an audio signal and drives the speaker based on the audio signal for an audio output. The image processing section may check whether the reception picture data is valid or invalid, sets the reception picture data as a reception display picture when it is determined that the reception picture data is valid, and retrieves the substitution picture data to set the substitution picture data as the reception display picture when it is determined that the reception picture data is invalid, and outputs the reception display picture to the display section.

Also, the image processing section may determine whether the reception picture data is valid or invalid, based on at least one of brightness data of the reception picture data and spatial frequency of the reception picture data.

Also, the substitution picture data may be one of a still image data and video picture data.

In another aspect of the present invention, a picture phone apparatus includes a display section; a substitution picture storage section which stores a substitution picture data; an audio processing section; an image processing section; a speaker; and a communication processing section. The communication processing section receives reception data, separates the reception data into reception picture data and reception audio data, and outputs the reception picture data to the image processing section and the reception audio data to the audio processing section. The audio processing section decodes the reception audio data to produce an audio signal and drives the speaker based on the audio signal for an audio output. The image processing section checks whether the reception picture data is valid or invalid, sets the reception picture data as a reception display picture when it is determined that the reception picture data is valid, and retrieves the substitution picture data to set the substitution picture data as the reception display picture when it is determined that the reception picture data is invalid, and outputs the reception display picture to the display section.

Here, the image processing section may determine whether the reception picture data is valid or invalid, based on at least one of brightness data of the reception picture data and spatial frequency of the reception picture data.

Also, the substitution picture data may be one of a still image data and video picture data.

In another aspect of the present invention, a picture data transmission method in a picture phone apparatus is achieved by picking up a picture data; by checking whether the picked-up picture data is valid or invalid; by encoding the picked-up picture data as transmission picture data when it is determined that the picked-up picture data is valid, and substitution picture data as the transmission picture data when it is determined that the picked-up picture data is invalid; by multiplexing the transmission picture data and transmission audio data into transmission data; and by transmitting the transmission data to a counter station.

Here, the picture data transmission method may further include displaying the transmission picture data. In this case, the encoding may be started when a picture transmission permission instruction is inputted from a user.

Also, the checking may be carried out based on at least one of brightness data of the picked-up picture data and spatial frequency of the picked-up picture data.

Also, the picture data transmission method may further include receiving reception data; separating the reception data into reception picture data and reception audio data; checking whether the reception picture data is valid or invalid; and displaying the reception picture data when it is determined that the reception picture data is valid, and the substitution picture data when it is determined that the reception picture data is invalid.

In this case, the checking may be carried out based on at least one of brightness data of the reception picture data and spatial frequency of the reception picture data.

Also, the substitution picture data may be one of a still image data and video picture data.

In another aspect of the present invention, a picture data transmission method is achieved by receiving reception data; by separating the reception data into reception picture data and reception audio data; by checking whether the reception picture data is valid or invalid; and by displaying the reception picture data when it is determined that the reception picture data is valid, and the substitution picture data when it is determined that the reception picture data is invalid.

Here, the checking may be carried out based on at least one of brightness data of the reception picture data and spatial frequency of the reception picture data.

Also, the substitution picture data may be one of a still image data and video picture data.

DESCRIPTION OF THE PREFERRED EMBODIMENTS

Hereinafter, a picture phone apparatus and a picture phone system using the same of the present invention will be described in detail with reference to the attached drawings.

Figure 1:
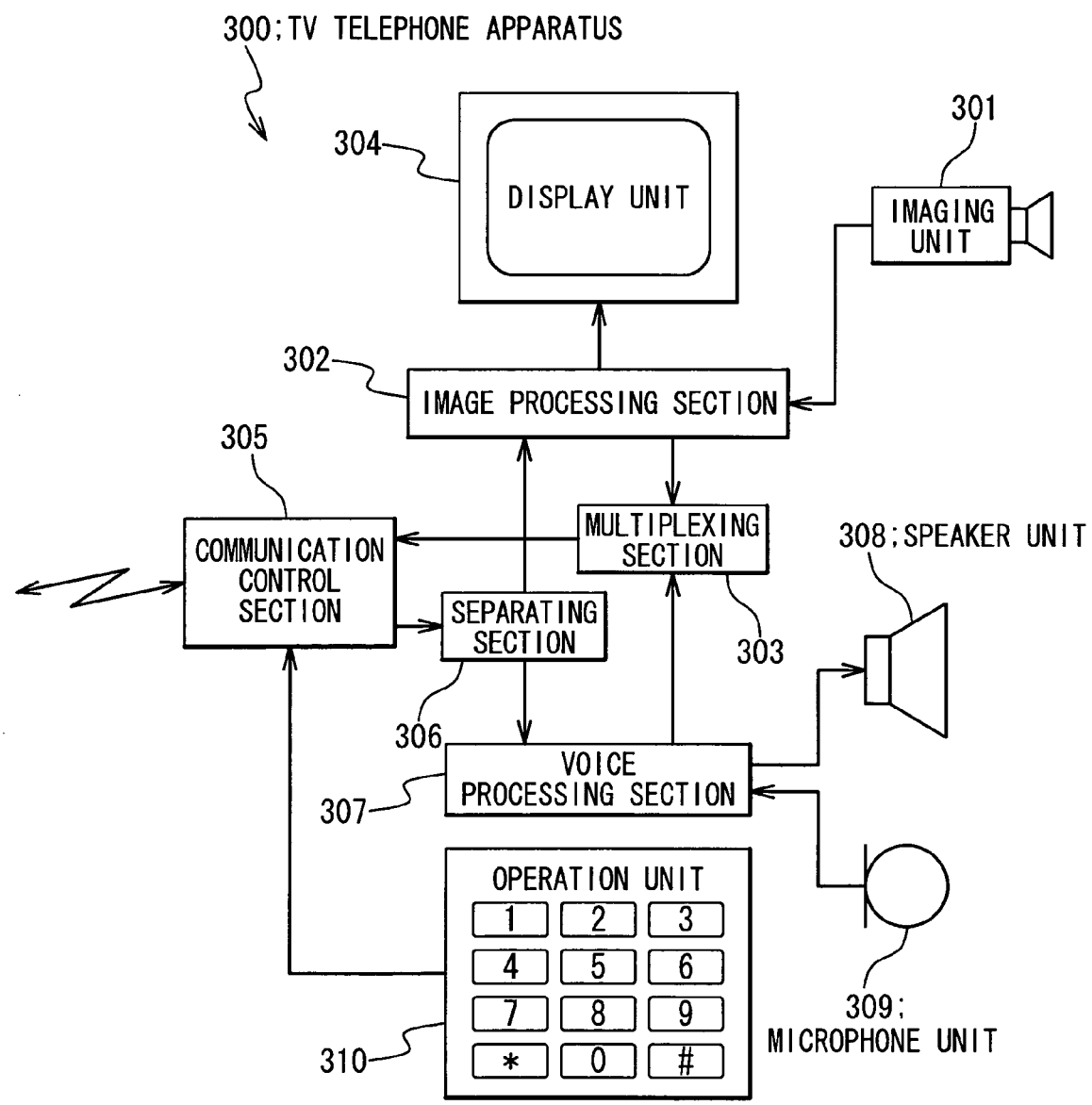
FIG. 1 is a block diagram showing the configuration of a conventional picture phone apparatus.
Figure 2:
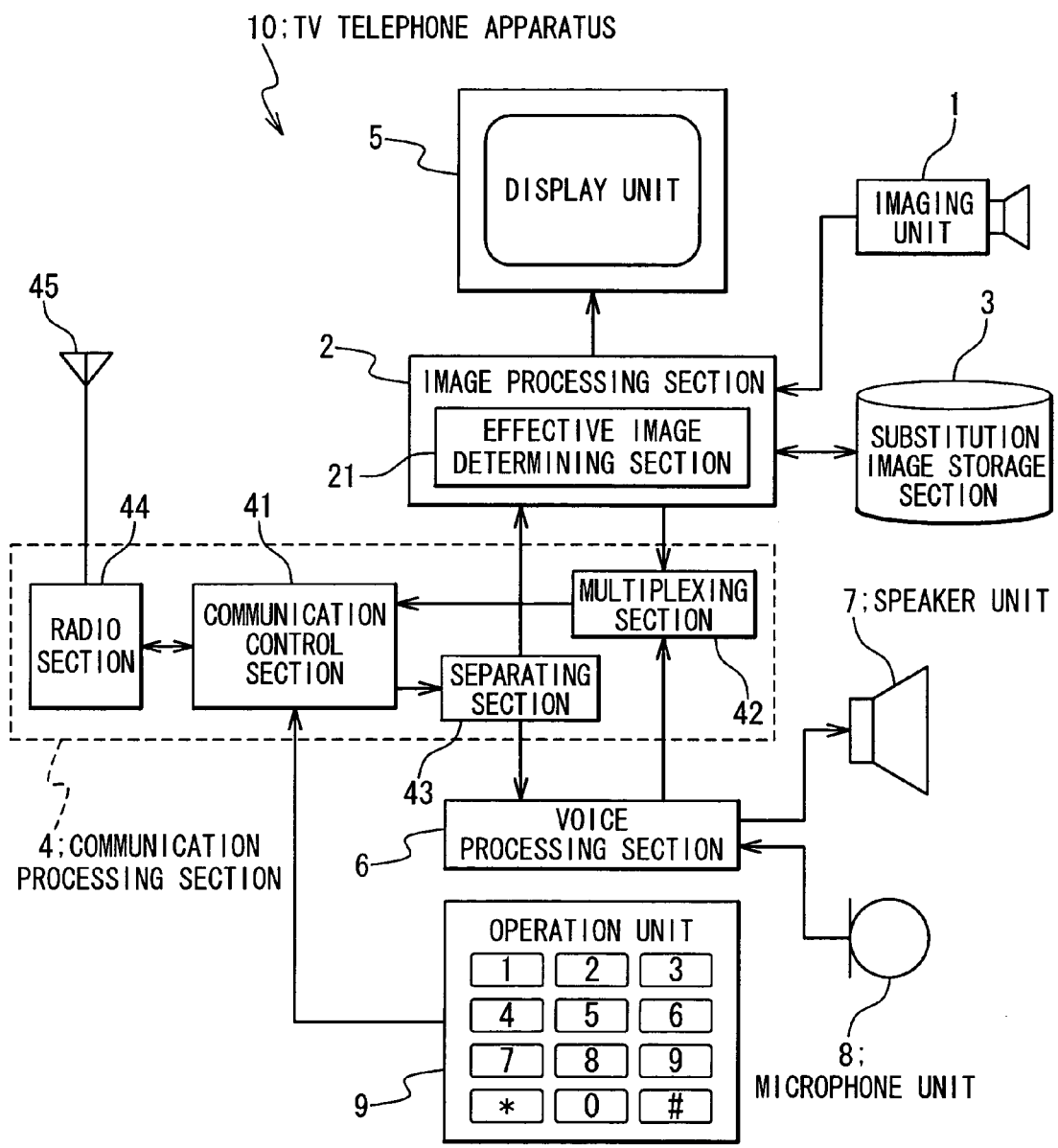
FIG. 2 is a block diagram showing the configuration of a picture phone apparatus according to an embodiment of the present invention.

FIG. 2 shows the picture phone apparatus according to an embodiment of the present invention. In the picture phone system, the picture phone apparatuses are connected through a public radio communication network (not shown) as a transmitter and a receiver.

The picture phone apparatus 10 is composed of an imaging section 1, an image processing section 2 including an image determining section 21, a substitution picture storage section 3, a communication processing section 4, a display section 5, an audio processing section 6, a speaker 7, a microphone 8 and an operation section 9. The communication processing section 4 is composed of a communication control section 41, a multiplier 42, a separator 43 and a radio section 44. The radio section 44 includes a transmitting/receiving circuit connected with an antenna 45. The image processing section 2 is connected with the imaging section 1, the substitution picture storage section 3, the multiplier 42, the display section 5 and the separator 43. The multiplier 42 and the separator 43 are connected with the audio processing section 6. The communication control section 41 is connected with the multiplier 42, the separator 43 and the operation section 9. In addition, the audio processing section 6 is connected with the speaker 7 and the microphone 8.

The operation section 9 includes alphanumeric keys and used for a dial operation for selecting a counter station and operations such as input of data and instructions like a communication start and a communication end.

The imaging section 1 includes a CCD camera for picking up picture data and an image processor for digitalizing the picked-up picture data. The imaging section 1 is installed on an upper portion of a housing (not shown) or an operation panel (not shown), otherwise, connected with the main body of the picture phone apparatus as an adapter. The substitution image storage section 3 stores substitution picture data.

The stored substitution picture data may be single or plural. In case of plural substitution picture data, one of the plural picture data selected by a user can be used.

The image determining section 21 detects picture determination data such as brightness data of the picture data and spatial frequency data of the picture data, and determines whether the picture data is valid or invalid, based on the picture determination data. The brightness data may be an average brightness of the picked-up picture data or the number of pixels darker than a threshold. The spatial frequency may be uniformity or the number of frequency components higher than a threshold. When determining from the brightness data of the picture data that the exposure of the picture data is not proper, the image determining section 21 determines the picture data is invalid. Also, when determining from the spatial frequency data of the picture data that the picture data is obscured by obstacles or contains many sharply changing portions, the image determining section 21 determines the picture data is invalid. When the picked-up picture data is determined to be valid, the image processing section 2 encodes the picture data picked up by the imaging section 1 to output as transmission picture data to the multiplier 42 and the display section 5. When the picked-up picture data is determined to be invalid, the image processing section 2 retrieves the substitution picture data from the substitution picture storage section 3 and encodes it to output as transmission picture data to the multiplier 42 and the display section 5, in place of the picked-up picture data from the imaging section 1. The display section 5 displays the transmission picture data and reception picture data, which are processed by the image processing section 2, on a liquid crystal display. The microphone 8 inputs and encodes speech of a user to produce transmission audio data. The multiplier 42 multiplexes the transmission picture data from the image processing section 2 and the transmission audio data from the audio processing section 6 to output transmission data to the communication control section 41.

The radio section 44 and the communication control section 41 transmit the transmission data from the multiplier 42 to the public radio communication network. On the other hand, when the radio section 44 and the communication control section 41 receive reception data from the public radio communication network, and output the reception signal to the separator 43. The separator 43 separates the reception data into the reception picture data and reception audio data. The reception picture data is decoded by the image processing section 2, and then displayed as a picture on the display section 5. Also, the reception audio data is outputted to the audio processing section 6. The audio processing section 6 decodes the reception audio data from the separator 43 to apply to the speaker 7 for an audio output.

It should be noted that the public radio communication network is for a mobile phone in this example, but may be for a private fixed telephone or public fixed telephone (wire telephone) network. Otherwise, it may be a communication network which deals with a radio communication or a specific communication network company.

Figure 3:
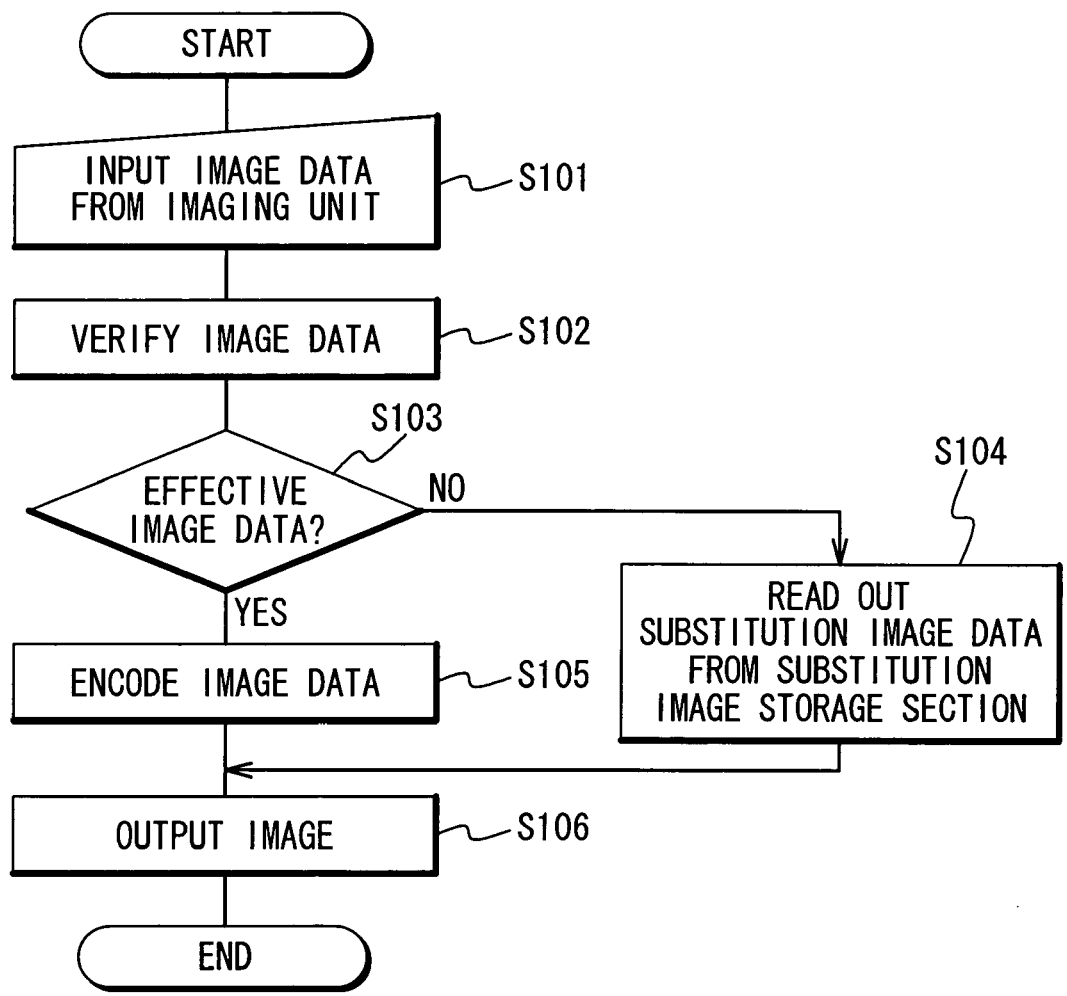
FIG. 3 is a flowchart showing a transmission process in the picture phone apparatus of the present invention.

Next, the procedure of the transmission in the picture phone apparatus 10 will be described with reference to FIG. 3. The user operates the operation section 9 when the user wants to issue a call to the counter station or in response to an arrived call. When the user speaks for the communication, the speech is converted into an electric signal by the microphone 8. The electric signal is encoded by the audio processing section 6 to generate transmission audio data and is sent to the multiplier 42. Also, a picture of the user or the background is picked up by the imaging section 1 to generate picture data, which is supplied to the image processing section 2 from the imaging section 1 (S101). At this time, whether the picked-up picture data is valid or invalid is checked based on the picture determination data by the picture determining section 21 (S102). When the picked-up picture data is determined to be a valid picture data by the picture determining section 21 (S103), the picked-up picture data is set as transmission picture data by the image processing section (S105). Contrary, when the picture determining section 21 determines the picked-up picture data to be invalid (S103), the substitution picture data is retrieved and acquired from the substitution picture storage section 3 by the image processing section 2 (S104). The substitution picture data is set as the transmission picture data by the image processing section 2 (S105). The transmission picture data, i.e., the picture data of the picked-up picture or the substitution picture data obtained in this way is sent from the image processing section 2 to the display section 5, and displayed on the display section 5 to allow the user to recognize or confirm it. At the same time, the transmission picture data is encoded by the image processing section 2 and outputted to the multiplier 42 (S106). The multiplier 42 multiplexes the transmission picture data from the image processing section 2 and the transmission audio data from the audio processing section 6 into the transmission data and outputs it to the communication control section 41. The communication control section 41 transmits the transmission data outputted from the multiplier 42 to a base station (not shown) of the public radio communication network through the radio section 44.

A radio wave from the base station of the public radio communication network is received by the radio section 44 as reception data. The reception data is processed by the communication control section 41. Then, the reception data is sent to the separator 43 which separates the reception data into the reception picture data and the reception audio data. The reception audio data is sent to the speaker 7 after being decoded by the audio processing section 6, and is converted into speech through an electricity-acoustic conversion. Also, the reception picture data is sent to the display section 5 after being decoded by the image processing section 2 and is displayed as a reception picture on the display section 5.

It should be noted that in the above example, the transmission picture data is sent to the multiplexer 42 in addition to the display section 5. However, the transmission picture data may be first sent to only the display section 5, and when the user confirms it and operates a picture transmission permission key (not shown) of the operation section 9, the transmission picture data may be sent to the multiplexer 42.

Also, the reception picture data may be displayed on the display section 5 automatically when it is received or after the picture transmission permission key is operated.

Figure 4:
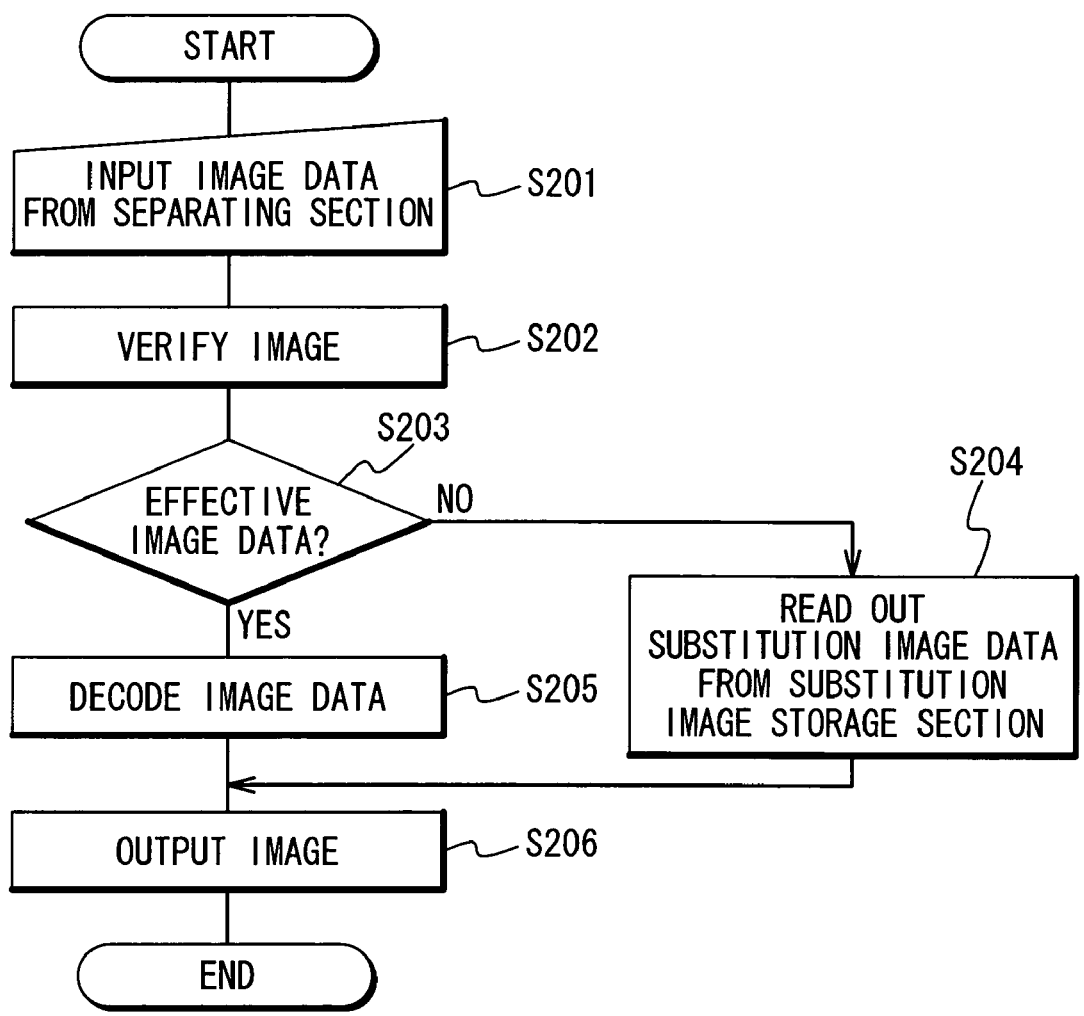
FIG. 4 is a flowchart showing a reception process the picture phone apparatus of the present invention.

FIG. 4 shows a reception process of the picture phone apparatus 10. The whole process of the reception will be described below with reference to FIG. 4.

When the communication of the picture phone apparatus is started in response to an operation of the operation section 9 by the user, the reception data from the base station of the public radio communication network is received by the radio section 44 and is sent to the separator 43 via the communication control section 41. The separator 43 separates the reception data into the reception picture data and the reception audio data. The separated reception audio data is decoded into an audio signal by the audio processing section 6. The decoded audio signal is send to the speaker 7 and a speech output is carried out through the electricity-acoustic conversion. The reception picture data is supplied to the image processing section 2 (S201). The picture determining section 21 of the image processing section 2 detects the picture determination data, and checks whether the reception picture data is valid or invalid, based on the picture determination data (S202). When the picture determining section 21 determines the reception picture data to be invalid (S203), the image processing section 2 retrieves and acquires the substitution picture data from the substitution picture storage section 3 (S204), and outputs the substitution picture data to the display section 5 (S206). The display section 5 displays the substitution picture data outputted from the image processing section 2 on the display. Contrary, when the picture determining section 21 determines the reception picture data to be valid (S203), the image processing section 2 decodes the reception picture data and outputs it to the display section 5 (S205). The display section 5 displays the reception picture data on the display.

As described above, according to the present invention, when the picked-up picture data is extremely dark and is obscured by obstacles so that a valid picture is not obtained, the transmission picture data is automatically switched from the picked-up picture data to the substitution picture data. As a result, an invalid picture can not be transmitted even if the valid picture data can not be picked up. Thus, only the normal picture, e.g., the picture with a proper exposure is transmitted, so that it is possible to use the picture phone comfortably. Especially, the present invention is effective when the picture phone apparatus is of a fold type. There is no case that the invalid picture is transmitted to a counter station even if the transmission operation is carried out in a state that the picture phone is folded.

Also, even if the valid picture is not received from the counter station, the reception picture is checked on the receiver side. The reception picture data is substituted by the substitution picture data, when the reception picture data is invalid. Therefore, even if the invalid picture data is received, the user of the picture phone apparatus can communicate with the counter station comfortably.

It should be noted that in the above-mentioned embodiment, the substitution picture data of the substitution picture storage section 3 may be a still image or a picture image, and may be a color picture or a monochrome picture. Moreover, the user can produce the substitution picture data using a personal computer and stores it in the substitution picture storage section 3.

The picture phone apparatus of the present invention is applicable to a notebook-sized personal computer, a fold-type mobile phone and a PHS, and a PDA (Personal Digital Assistant). Also, the present invention may be constituted as a picture phone exclusive use machine or a composite machine mainly constituted of a personal computer.

As mentioned above, according to the picture phone apparatus and the picture phone system of the present invention, the picture determining section determines whether the picture data is valid or invalid. The valid picture data is encoded into a transmission picture data. When the picture data is invalid, the substitution picture data is retrieved from the substitution picture storage section and encoded into the transmission picture data. Therefore, it is possible to prevent the invalid picture data from being transmitted, even if the picture data is picked up under the environment that the valid picture can not be taken, i.e., in a dark place and in a state of existence of obstacles. Also, it is possible to display the valid picture data at both of the transmitter and receiver sides. As a result, the picture phone never gives an unpleasant feeling to users.

Also, according to the picture phone apparatus of the present invention, the picture determining section determines whether the reception picture data from the counter station is valid or invalid. If the picture data is valid, it is decoded and is displayed on the display section. If the reception picture data is invalid, the substitution picture data is retrieved and decoded from the substitution picture storage section and is then displayed on the display section instead of the reception picture data. Therefore, it is possible to display the substitution picture data on the receiving side, even if the invalid picture data is transmitted because of the environment such as the dark place and obstacles. As a result, the picture phone apparatus never gives an unpleasant feeling to users.

Moreover, according to the picture phone apparatus of the present invention, the image determining section determines whether the picked-up picture is valid or invalid, in case of transmission. If the picture data is valid, it is used for transmission as it is. If the picture data is invalid, the substitution picture data stored in the substitution picture storage section is retrieved and used as the transmission picture. In addition, the picture determining section determines whether the reception picture from the counter station is valid or invalid, in case of reception. If the picture data is valid, it can be decoded and displayed as it is on the display section. If the picture data is invalid, the substitution picture data can be displayed on the display section instead of the reception picture data. Therefore, it is possible to transmit, receive and display the picture data in a normal state, so that the picture phone never gives an unpleasant feeling to users.

What is claimed is:

1. A picture phone apparatus comprising:
   an image picking section which picks up a picture data;
   a display section;
   a substitution picture storage section which stores a substitution picture data;
   an image processing section which checks whether said picked-up picture data is valid or invalid based on at least one of brightness data of said picked-up picture data and spatial frequency of said picked-up picture data, retrieves said substitution picture data from said substitution picture storage section to output as transmission picture data when it is determined that said picked-up picture data is invalid, sets said picked-up picture data as said transmission picture data when it is determined that said picked-up picture data is valid, and encodes said transmission picture data; and
   a communication processing section which multiplexes said encoded transmission picture data and transmission audio data into transmission data and transmits said transmission data to a counter station.

2. The picture phone apparatus according to claim 1, wherein said image processing section controls said display section to display said transmission picture data.

3. The picture phone apparatus according to claim 2, further comprising:
   an operation section.
   wherein said image processing section encodes and outputs said transmission picture data to said communication processing section when a picture transmission permission instruction is inputted from said operation section.

4. The picture phone apparatus according to claim 1, further comprising:
   an audio processing section; and
   a speaker,
   wherein said communication processing section receives reception data, separates said reception data into reception picture data and reception audio data, and outputs said reception picture data to said image processing section and said reception audio data to said audio processing section.
   said audio processing section decodes said reception audio data to produce an audio signal and drives said speaker based on said audio signal for an audio output, and
   said image processing section checks whether said reception picture data is valid or invalid, sets said reception picture data as a reception display picture when it is determined that said reception picture data is valid, and retrieves said substitution picture data to set said substitution picture data as said reception display picture when it is determined that said reception picture data is invalid, and outputs said reception display picture to said display section.

5. The picture phone apparatus according to claim 1, wherein said image processing section determines whether said reception picture data is valid or invalid, based on at least one of brightness data of said reception picture data and spatial frequency of said reception picture data.

6. The picture phone apparatus according to claim 1, wherein said substitution picture data is one of a still image data and video picture data.

7. A picture phone apparatus comprising:
   a display section;
   a substitution picture storage section which stores a substitution picture data;
   an audio processing section;
   an image processing section;
   a speaker; and
   a communication processing section which receives reception data, separates said reception data into reception picture data and reception audio data, and outputs said reception picture data to said image processing section and said reception audio data to said audio processing section,
   wherein said audio processing section decodes said reception audio data to produce an audio signal and drives said speaker based on said audio signal for an audio output, and
   said image processing section checks whether said reception picture data is valid or invalid based on at least one of brightness data of said reception picture data and spatial frequency of said reception picture data, sets said reception picture data as a reception display picture when it is determined that said reception picture data is valid, and retrieves said substitution picture data to set said substitution picture data as said reception display picture when it is determined that said reception picture data is invalid, and outputs said reception display picture to said display section.

8. The picture phone apparatus according to claim 7, wherein said substitution picture data is one of a still image data and video picture data.

9. A picture data transmission method in a picture phone apparatus comprising:
   picking up a picture data;
   checking whether said picked-up picture data is valid or invalid based on at least one of brightness data of said picked-up picture data and spatial frequency of said picked-up picture data;
   encoding said picked-up picture data as transmission picture data when it is determined that said picked-up picture data is valid, and substitution picture data as said transmission picture data when it is determined that said picked-up picture data is invalid:

multiplexing said transmission picture data and transmission audio data into transmission data; and transmitting said transmission data to a counter station.

10. The picture data transmission method according to claim 9, further comprising:

displaying said transmission picture data.

11. The picture data transmission method according to claim 10, wherein said encoding is started when a picture transmission permission instruction is inputted from a user.

12. The picture data transmission method according to claim 9, further comprising:

receiving reception data;

separating said reception data into reception picture data and reception audio data;

checking whether said reception picture data is valid or invalid; and displaying said reception picture data when it is determined that said reception picture data is valid, and substitution picture data when it is determined that said reception picture data is invalid.

13. The picture data transmission method according to claim 9, wherein said checking is carried out based on at least one of brightness data of said reception picture data and spatial frequency of said reception picture data.

14. The picture data transmission method according to claim 9, wherein said substitution picture data is one of a still image data and video picture data.

15. A picture data transmission method comprising:

receiving reception data;

separating said reception data into reception picture data and reception audio data;

checking whether said reception picture data is valid or invalid based on at least one of brightness data of said reception picture data and spatial frequency of said reception picture data; and displaying said reception picture data when it is determined that said reception picture data is valid, and said substitution picture data when it is determined that said reception picture data is invalid.

16. The picture data transmission method according to claim 15, wherein said substitution picture data is one of a still image data and video picture data.

* * * * *